SEMICONDUCTOR ANALOG-TO-DIGITAL CONVERTER SYSTEM

Filed March 14, 1961 5 Sheets-Sheet 1

Dec. 28, 1965 M. GARDEN 3,226,708

SEMICONDUCTOR ANALOG-TO-DIGITAL CONVERTER SYSTEM

Filed March 14, 1961 5 Sheets-Sheet 2

Dec. 28, 1965 M. GARDEN 3,226,708

SEMICONDUCTOR ANALOG-TO-DIGITAL CONVERTER SYSTEM

Filed March 14, 1961 5 Sheets-Sheet 3

SEMICONDUCTOR ANALOG-TO-DIGITAL CONVERTER SYSTEM

Filed March 14, 1961 5 Sheets-Sheet 5

3,226,708
SEMICONDUCTOR ANALOG-TO-DIGITAL CONVERTER SYSTEM

Murray Garden, Oreland, Pa., assignor to Leeds and Northrup Company, Philadelphia, Pa., a corporation of Pennsylvania Filed Mar. 14, 1961, Ser. No. 95,714
14 Claims. (Cl. 340—347)

Figure 1:
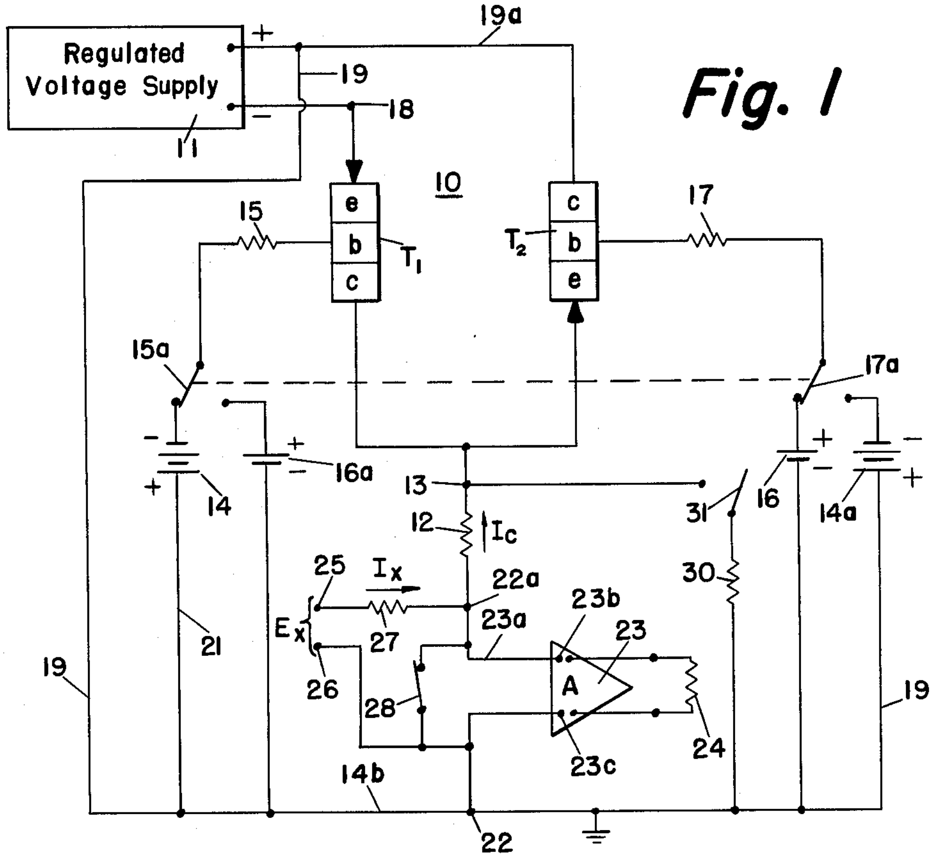

This invention relates to transistor circuits and has for an object the provision of a semi-conductor circuit for producing from a regulated and an unregulated source of supply a constant current output where the load on the regulated source of supply is but a small fraction of that on the unregulated source and which is particularly adapted to the provision of switching circuits for high-speed, high-accuracy analog-to-digital converters as well as for digital to analog conversion.

Voltage-regulated sources of supply to produce constant current outputs have the disadvantage that their cost rises with increase in current output. Accordingly, if a constant current output can be provided with a major proportion of current supplied from an unregulated source and a minimum of output current required from a voltage-regulated source in achievement of the same precision of control, considerable savings can be realized not only in cost, but in size of components and final design and with decreased difficulties in drift due to the need to dissipate heat generated by reason of larger loads.

It is an object of the present invention to provide a constant current source of supply utilizing an unregulated voltage source of substantially all of the current supplied to a load and a regulated voltage source of supply available to provide a minor fraction of the current to the load, the regulated source of supply being effective to maintain the current constant at a predetermined level.

It is a further object of the present invention to provide switching circuits utilizing semi-conductor devices and in particular, transistors having an unregulated source of supply for producing a relatively large flow of current between the collector and base relative to the magnitude of current flowing in the emitter-collector circuit, thereby to minimize the potential difference developed in the emitter-collector circuit by the transistor in the conductive state.

In carrying out the present invention, there is provided a transistor having connected in series with its base and collector an unregulated source of supply together with a precision resistor and a current-limiting resistor. There is also connected in series with the emitter and collector of the transistor and the precision resistor a voltage-regulated source of supply having a current output materially less than that of the unregulated source. Since the unregulated source supplies current to the transistor rendering it fully conductive, (meaning operation within the saturation range) there is developed between the emitter and collector a potential difference which remains negligibly small though the current through the transistor may change through a relatively wide range. Accordingly, there may be supplied from the unregulated source by way of the collector and base to the precision resistor the major component of current with a minor proportion thereof supplied from the voltage-regulated source of supply. The latter is, nevertheless, effective to maintain constant the current through the precision resistor and as a result, there may be derived from the precision resistor a constant or standard current output of particular advantage in the switching circuits utilized in converters, both analog-to-digital and vice versa.

The transistor is connected for flow of current (the PNP type) from collector to base from the unregulated source of supply, while the regulated source of supply is connected in the collector emitter circuit with the negative terminal connected to emitter. The current flow by way of the regulated source of supply is not only a small fraction of that from the unregulated source, but in addition, the foregoing connection of the transistor operating within its saturation range minimizes the potential drop across the transistor.

In converters, to which the invention is applicable, there is included with the above transistor a second transistor which when the first transistor is rendered non-conductive, is made conductive to provide a low impedance path for leakage current from the first transistor, thus substantially entirely to remove any current flow through the precision resistor during the time the first transistor is non-conductive. By means of suitable switching circuits, integrated sources of supply and a comparison amplifier later to be described in detail, each of a plurality of switching devices of the kind just described may be utilized for the production of outputs in digital form from an analog input which, in the example to be described, is in the form of a voltage or current the magnitude of which is to be measured.

As used in the present description and claims, the term "digital" is defined as a selected positional notation utilized to represent numbers, of which the binary system is the one which will be utilized in the following examples.

Figure 2:
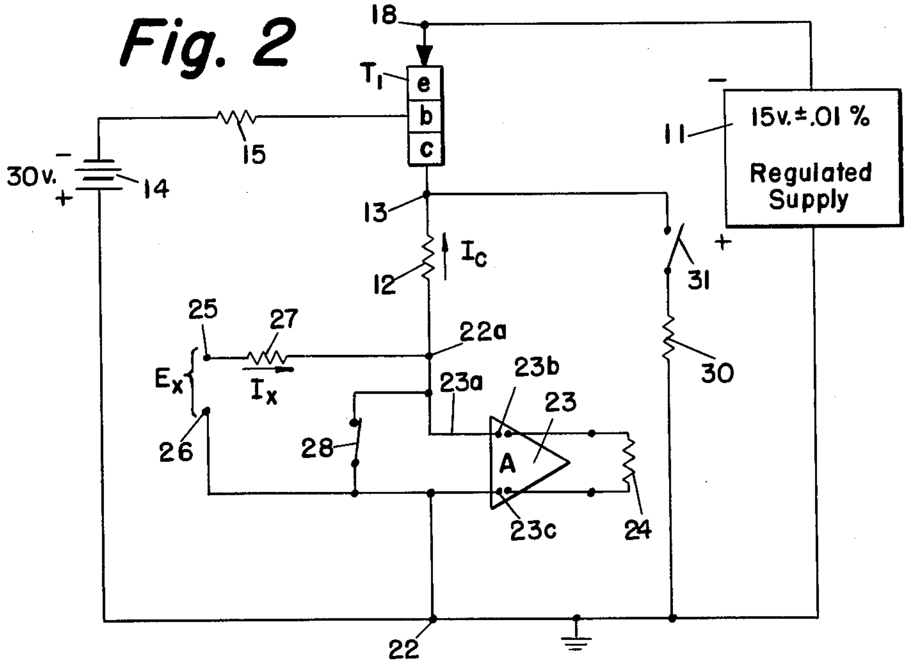
Figure 3:
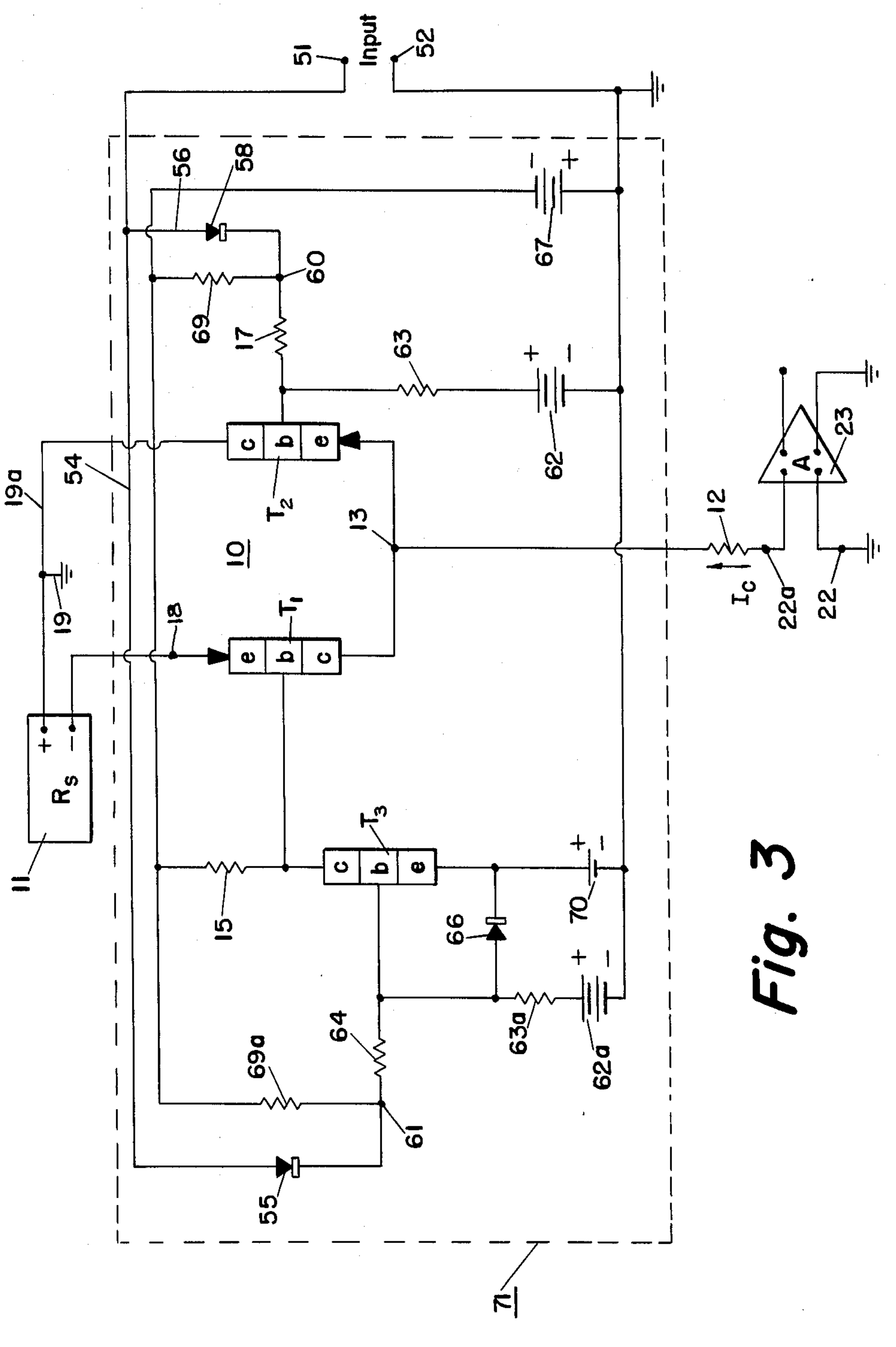
Figures 4A, 4B:
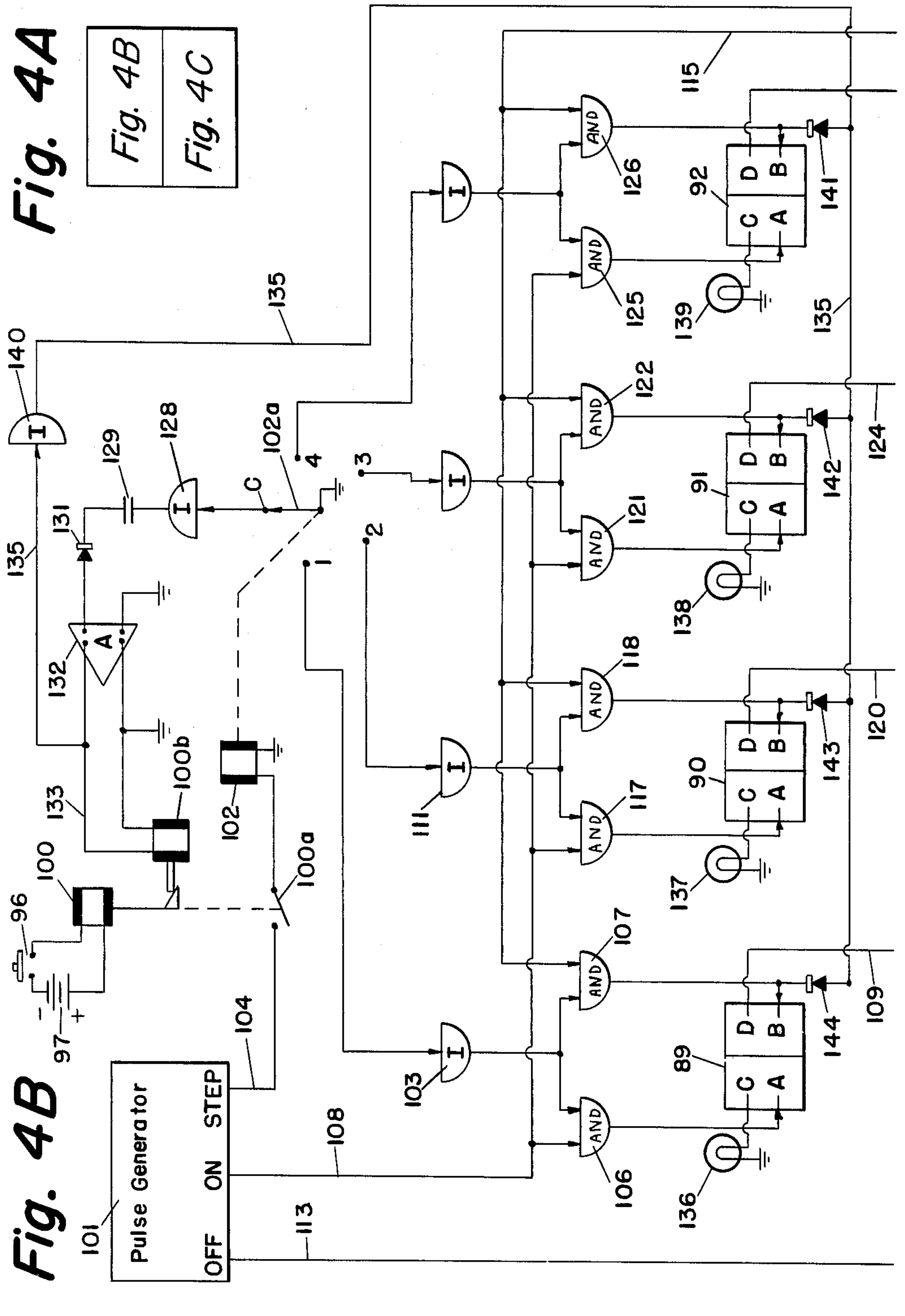
Figure 4C:
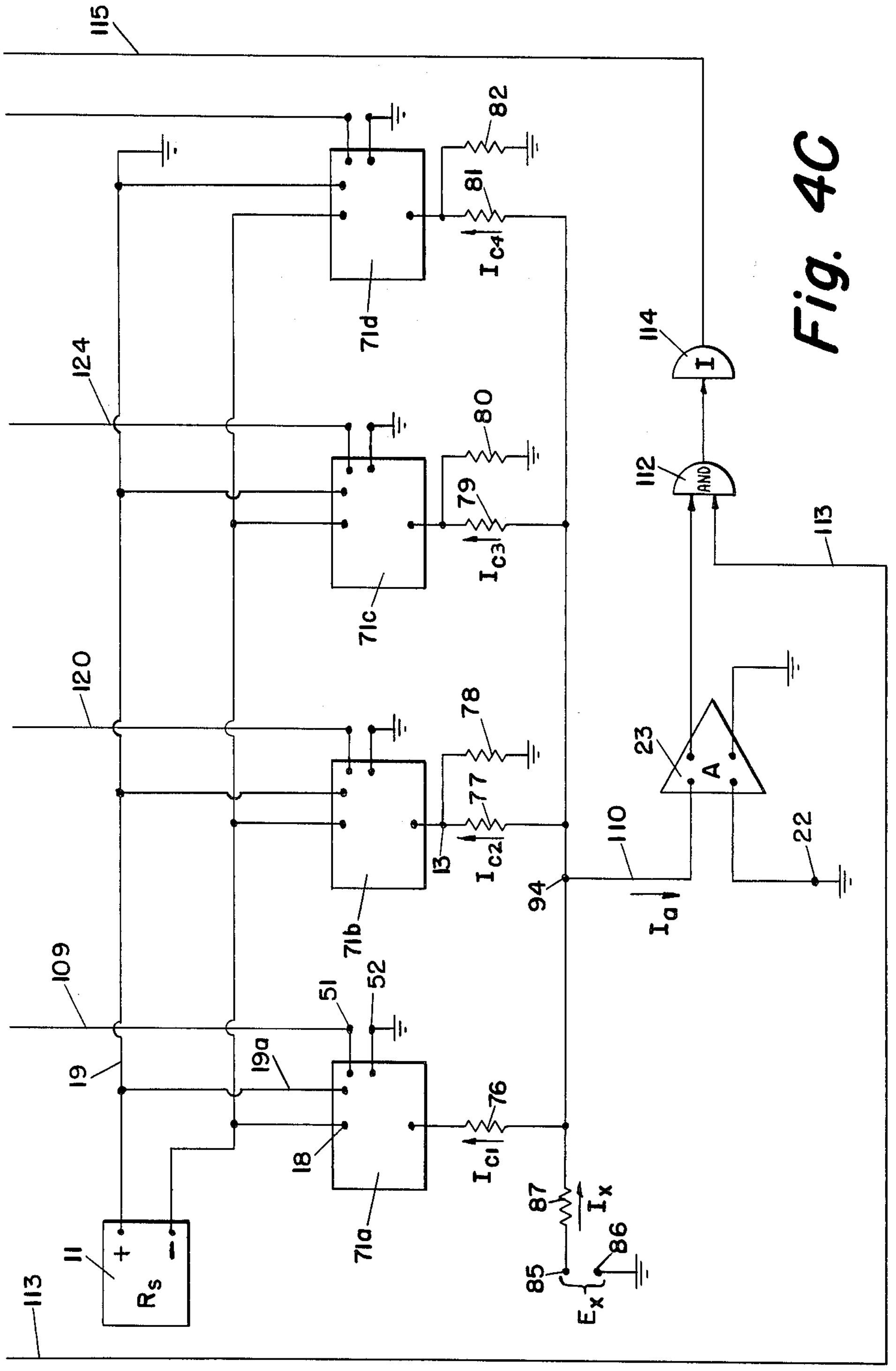
Figure 5:
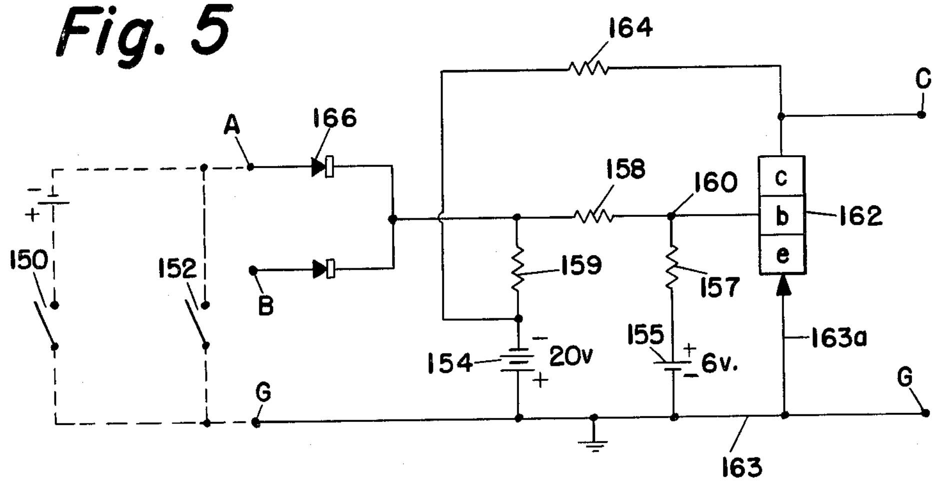
Figure 6:
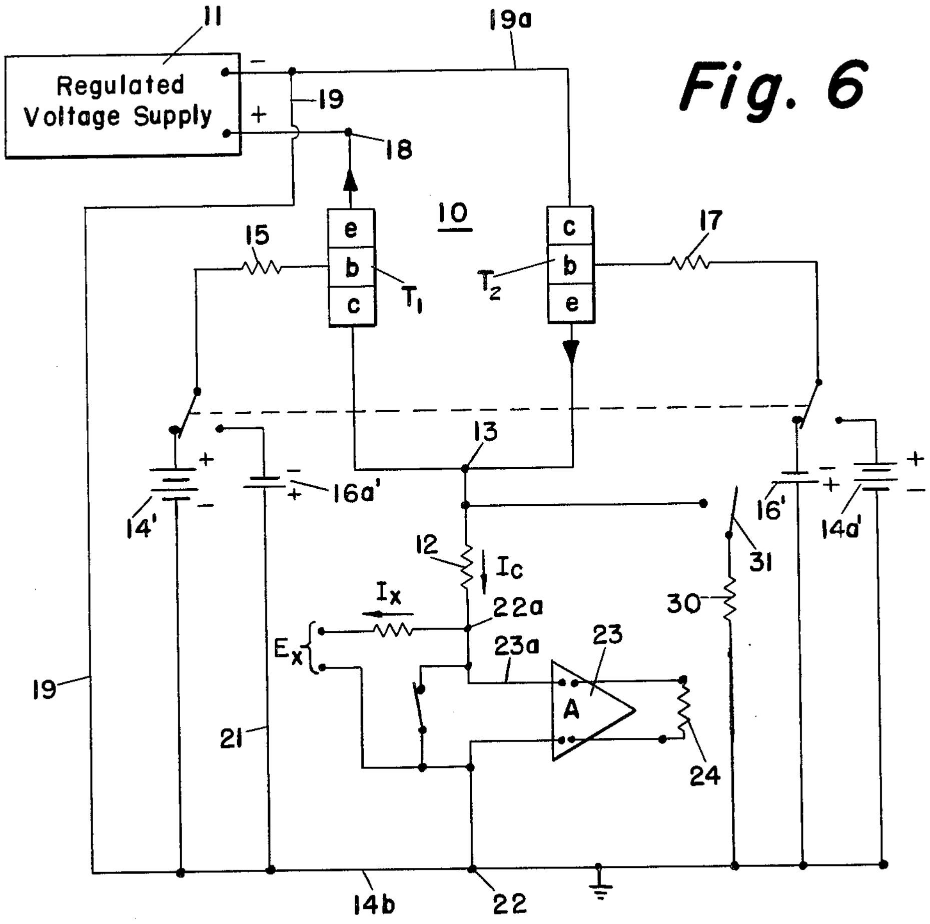

For a more detailed understanding of the invention, reference is to be had to the following description taken in conjunction with the accompanying drawings, in which:

FIG. 1 diagrammatically illustrates a switching device embodying the invention;

FIG. 2 diagrammatically illustrates a part of the switching device of FIG. 1 in itself useful for some applications and which facilitates the explanation of the present invention;

FIG. 3 diagrammatically illustrates a switching arrangement including the switching device of FIG. 1 and control circuits;

FIG. 4A illustrates how FIGS. 4B and 4C are to be combined;

FIGS. 4B–4C diagrammatically illustrate a converter utilizing a plurality of switching devices;

FIG. 5 diagrammatically illustrates a logic circuit suitable for the AND and inverter circuits of the gates illustrated in FIG. 4; and FIG. 6 diagrammatically illustrates a switching device with NPN transistors respectively substituted for the PNP transistors of FIG. 1.

Referring now to FIG. 1, the invention in one form has been shown as comprising a switching device 10 having a first transistor $T_1$, of the PNP type, the collector *c* of which is conductively connected to the emitter *e* of a second transistor $T_2$. The emitter *e* of transistor $T_1$ is connected to the negative terminal of a voltage-regulated source of supply 11, while the positive terminal of that source is through conductors 19 and **14*b* connected to the junction point 22. A precision resistor 12 is connected at junction point 13** to the circuit extending between the collector of transistor $T_1$ and the emitter of transistor $T_2$.

The side of the precision resistor 12 remote from point 13 is by conductor **23*a* connected to one input terminal 23*b* of a comparison amplifier 23 and the other input terminal 23*c* of the amplifier 23 is connected to the point 22. An unknown potential $E_x$ applied to input terminals 25 and 26 produces current flow through a resistor 27 and through the input of the comparison amplifier 23. For purposes of explanation it will be assumed that the input circuit of the amplifier 23 has such a low impedance that a switch 28** for purposes of circuit analysis may be shown in closed position. Thus the side of the precision resistor 12 remote from point 13 may be considered as directly connected to the point 22.

Accordingly, the operation of the amplifier 23 will be disregarded for the purposes of the immediately following discussion though it will be later described in detail and its input impedance need not be of a low order. It is to be further noted that a shunting resistor 30 may be connected by means of a switch 31 in parallel with the precision resistor 12.

The voltage-regulated source 11 may be of any conventional type, of which many are known to those skilled in the art. An advantage of the present invention resides in the fact that the voltage-regulated source of supply 11 need have but a small output in terms of current and power and as compared with the current and power from an unregulated source of supply, symbolically represented by a battery 14. That battery has its negative side connected through a switch 15*a* and a series resistor 15 to to the base of the transistor $T_1$, while the positive side of source 14 is connected by way of conductors 21 and 14*b* to the point 22. There is thus formed both an input circuit for the transistor $T_1$ and a circuit for the supply of current to the precision resistor 12. The unregulated source 14 has a voltage materially higher than that of the regulated source 11. For example, source 14 may have a voltage output of 30 volts, while the regulated source 11 may have a voltage output of but 15 volts. In such case, a current-limiting resistor 15 may have a value of about 15,000 ohms, while the precision resistor 12 will have a value preferably within plus or minus (+) 0.01% of 15,000 ohms.

The application of the source 14 to the base *b* of transistor $T_1$ is effective as a source of current not only to render it conductive, but also to bring it into operation well within its saturating range. This means it is "fully" turned on. With the transistor $T_1$ thus fully turned on, for flow of current of about one milliampere for a PNP type 2N520, and with a low order of emitter current, the resistance between the emitter and the collector is negligible, thus the potential drop across the transistor remains at an insignificantly low value, of the order of one millivolt.

There is connected by way of resistor 17 and switch 17*a* to the base of transistor $T_2$ the positive side of a source or bias 16 for the purpose of turning off transitor $T_2$ while transistor $T_1$ is turned on. The collector of transistor $T_2$ is connected to point 22 by way of conductors 19*a* and 19.

Inasmuch as transistor $T_2$ has been turned off and thus has no bearing on the operation of transistor $T_1$, the circuit of FIG. 1 may be redrawn as illustrated in FIG. 2 with transistor $T_2$ and its associated circuits omitted. An inspection of the circuit diagram of FIG. 2 will reveal that the voltage-regulated source 11 has its positive side connected to the point 22 and its negative side to point 18 and to the emitter of transistor $T_1$. Accordingly, the voltage of the regulated source will divide between the points 18 and 22 with one millivolt (the illustrated small finite value) between the emitter and collector and with remainder across the precision resistor 12. The potential difference across the precision resistor 12 arises due to the flow therethrough of two components of current. The larger or the base-current component from the unregulated source 14 may, in the foregoing example, approximate 0.95 milliampere. With the assumed circuit components, the current through the precision resistor 12 will be to a very close approximation within plus or minus .02% of one milliampere. The difference current of 0.05 milliampere in this example will be supplied from the voltage-regulated source 11. Stated differently, as between the points 18 and 22 the voltage is fixed at a value maintained by the regulated supply 11, in the example, at 15 volts. The potential distribution between points 18 and 22 comprises the small value of one millivolt across the transistor $T_1$ and the voltage of 14.999 volts appearing across the precision resistor 12. Since the value of one millivolt across the transistor $T_1$ is to a close approximation a fixed value, then the larger proportion of the voltage of the regulated supply appears across the precision resistor 12. Accordingly, the potential difference across that resistor will to the aforesaid close approximation equal that of the regulated supply and that potential difference will be developed by the predominantly large current component from the unregulated source 14 and the very small component from the regulated source 11, the two components always adding together algebraically so that the product of their sum times the resistance of the precision resistor 12 will to the foregoing close approximation equal that of the voltage of the regulated supply 11.

From the foregoing, it will be seen that the voltage-regulated source of supply 11 need only be designed for relatively small loads, which may be less than 1 milliampere and for delivery of but a small fraction of the current supplied by the unregulated source 14.

It is to be understood that if the current from the unregulated source 14 goes above one milliampere, that part above one milliampere will flow by way of the regulated source of supply 11, from emitter to base of transistor $T_1$ and thence through the resistor 15 to the source 14. The increased current flow through the resistor 15 will increase the potential drop and will leave the net current through the precision resistor 12 as one milliampere.

Referring again to FIG. 1, it will now be assumed that the switches 15*a* and 17*a* are positioned so that the source 16*a* has its positive side connected through switch 15*a* and the resistor 15 to the base of transistor $T_1$ and the negative side of source 14*a* is connected through the switch 17*a* and the resistor 17 to the base of transistor $T_2$. The source 14*a* is effective to turn on the transistor $T_2$ for flow of current within the saturation range.

Thus there is flow of current from the positive side of source 14*a* through the conductors 14*b*, 19, and 19*a*, the collector, base, and thence through the resistor 17 to the negative side of source 14*a*. Since there is no emitter-collector source of supply for transistor $T_2$, it will be seen that transistor $T_2$ has no emitter current flow. Thus, no current flows through the precision resistor 12 since transistor $T_2$ has no emitter current flow and transistor $T_1$ is non-conductive. Accordingly, since there is no current flowing through precision resistor 12, the switching device 10 is said to be in its "off" position. That device is "on" when current flows through resistor 12 as it does when transistor $T_1$ is on and transistor $T_2$ is off.

There will now be considered the leakage current flowing from the non-conductive transistor and its effect on the other circuit components of the switching device 10. When the switching device is in its on position, with transistor $T_1$ on and transistor $T_2$ off, then leakage currents from the non-conductive transistor $T_2$ have two possible current paths, one by way of the precision resistor 12 and the other by way of the conductive transistor $T_1$ and the regulated source 11. Since the conductive transistor $T_1$ and the source 11 comprise a much lower impedance path than the path by way of the resistor 12, it will be seen that the leakage current flows through the transistor $T_1$ and the source 11 rather than through the precision resistor 12. Thus, for the on position of the device 10, the leakage current from the off transistor $T_2$ has no effect (at least a wholly negligible one) on the constant current flowing through the precision resistor 12. In similar manner, when the switching device 10 is in its off position, or transistor $T_2$ on and transistor $T_1$ off, then leakage current from the collector of the non-conductive transistor $T_1$ will flow through the low impedance path of the conductive transistor $T_2$ to the point 22 in preference to the higher impedance path of the precision resistor 12. With the above in mind, it will now be obvious that when a transistor is non-conductive, its leakage current will flow through the other conductive transistor rather than through the precision resistor 12 and thus minimize the possibility of error due to leakage current.

It is to be noted that with transistor $T_2$ turned on, current flows from source 14a (with switch 17a in its right-hand position) by way of conductors 19 and 19a, and from the collector to base of transistor $T_2$, and by way of resistor 17 to the source shown as battery 14a. The voltage of the battery 14a and the value of the resistor 17 are selected for flow of one milliampere of current which assures operation of transistor $T_2$ within the saturation range. Leakage currents from transistor $T_1$ will have values and paths corresponding with those described when transistor $T_1$ was made conductive. When the transistor $T_2$ is conductive there is operation with introduction of a minimum of resistance in the emitter-collector circuit of that transistor and a negligible potential difference across the emitter and collector.

There has thus far been described the manner in which a constant current $I_c$ flows through the precision resistor 12 or between points 13 and 22, which in the above example was one milliampere ±.02%.

In a typical embodiment of the circuit of FIG. 1, the transistors $T_1$ and $T_2$ are of the PNP type, such for example as 2N520. Many types of PNP or NPN transistors will be satisfactory with and without needed changes in circuit parameters, as, corresponding changes in resistance and voltage.

Since the potential difference between the points 18 and 22 remains constant due to the provision of the regulated source of supply 11, it will be seen at once that the value of the current $I_c$ through the precision resistor 12 will to a close approximation depend upon the resistance value of that resistor. Thus, if the originally assumed value of 15,000 ohms be doubled, then the current $I_c$ will be one-half its previous value. This will be so whether or not the switch 31 be closed to establish a current path through the shunting resistor 30. However, in order to maintain the operation of transistor $T_1$ within the saturating range (meaning fully turned on), it is desirable to provide the shunting resistor 30 so that the current through transistor $T_1$ remains of the same order as before. Accordingly, where it is desired to have the current value $I_c$ reduced to one-half of its previous value, the resistor 30 will have a nominal value of 30,000 ohms. Though the resistance value of resistor 30 differs from its nominal value, there is no effect upon the value of the current $I_c$ since its magnitude is determined solely by the series resistance of its circuit and the constant voltage source 11. Though the current through resistor 12 has been reduced by factor of one-half, the transistor current remains of the same order of magnitude as before, namely, approximately one milliampere.

With the above in mind, and with switch 28 in the open position, FIG. 1, there will now be described how the foregoing constant current $I_c$ may be compared with unknown current $I_x$. It will be remembered that the unknown voltage $E_x$ applied to the terminals 25 and 26 produces an unknown current $I_x$ which as shown by the arrow is assumed to flow through a precision resistor 27 and in the direction towards a summing point 22a. The direction of the constant current $I_c$ is also as indicated by an arrow as flowing in a direction away from the summing point 22a. The difference current will flow through the input circuit of amplifier 23. Thus if $I_x$ is greater in magnitude than $I_c$ the difference current will flow into the amplifier 23 by way of conductor 23a. When the current $I_c$ is of greater magnitude than the current $I_x$, then the difference current reverses in direction and flows by way of junction point 22, terminals 23c and 23b and by way of conductor 23a towards the summing point 22a. Thus, the direction of the difference current will indicate whether $I_x$ is greater or less than $I_c$.

In a preferred application of the invention to form component parts of a converter system, FIG. 4C, a plurality of semi-conductor circuits of the type shown in FIG. 1 are utilized each with differing values of the resistors 12 and 30 for flow of different values of $I_c$ through the respective precision resistors. Thus, by providing a plurality of circuits, such as illustrated in FIG. 1, the several values of current $I_c$ can in a summing circuit be selectively added together until the sum shall equal the value of the unknown current $I_x$. In accordance with this preferred application of the invention, the values of the constant currents $I_c$ respectively flowing through the several precision resistors will correspond in magnitude to the magnitudes of the digits of the several orders or positions of a binary number. Specifically, the current through the precision resistor of the second circuit of FIG. 1 will be half that of the current in the first circuit, and the third circuit half that of the preceding circuit. The foregoing arrangement has been illustrated in FIG. 4C and will later be described in detail.

Referring now to FIG. 3, there has been illustrated the system of FIG. 1 with the addition thereto of control circuits particularly suited to the high-speed application of the system of FIGS. 4B–4C, in which system there will be utilized a plurality of the circuits of FIG. 3. In the system of FIG. 3, the manually or automatically operable single-pole, double-throw switches 15a and 17a of FIG. 1 have been replaced by control circuits operable in response to control signals applied to the input terminals 51 and 52. Negative-going input pulses will be considered to be those below ground potential. Thus, ground potential at the terminal 52 will be positive relative to the terminal 51 and positive pulses will correspond to ground potential. As will later be shown, the system of FIG. 3 does not distinguish between an open circuit at the input terminals 51 and 52 and the application thereto of a negative pulse.

It will first be assumed that a positive signal is applied to the terminals 51 and 52 (for analytical purposes, consider terminal 52 connected to terminal 51). It will be observed that the input terminal 51 is connected by way of conductors 54 and 56 to a diode 58 and by way of the conductor 54 to a second diode 55. Since the applied input signal is positive, the diodes 55 and 58 have applied to them a signal which renders them conductive. Thus, as diode 58 is rendered conductive, the potential of the point 60 is changed from its previous negative value to ground potential. This is accomplished by the completion of a circuit for the battery 67 which from its positive terminal may be traced by way of ground, input terminals 52 and 51, conductors 54 and 56, and thence by the diode 58, point 60 and resistor 69 to the negative side of battery 67. The net result is that the positive bias potential of bias battery 62 is then made effective by way of resistor 63 to bias the base in a positive direction relative to its collector which, it is noted, is connected to ground. Thus the transistor $T_2$ is "turned off" or rendered non-conductive.

Similarly, the positive signal applied to the input terminals 51 and 52 effectively connects the junction point 61 to ground and thus renders effective the bias battery 62a to apply a positive potential to the base *b* of transistor $T_3$. More particularly, the positive potential applied by way of input terminal 51 renders the diode 55 conductive. When the diode 55 is conductive, it forms a circuit for the current from the battery 67 which current then flows by way of ground, the input circuit of terminals 52, 51, diode 55, thence by way of resistor 69a to the other side of that battery. It is in this manner that the bias battery 62a makes the base positive relative to the emitter and turns off or renders non-conductive the transistor $T_3$. It is to be noted that a diode 66 is connected between the base and emitter of transistor $T_3$ and is effective to protect the emitter-base junction from undesired high positive potentials and such as might damage that junction.

With the transistor $T_3$ non-conductive, the battery 67 is effective to turn on or to render conductive the transsistor $T_1$. This is accomplished by reason of the fact the positive terminal of the battery 67 is connected to ground and thus through the input circuit of the amplifier 23 and the resistor 12 makes the collector of transistor $T_1$ positive relative to the point of connection of the base *b* to the resistor 15 which is connected directly to the negative side of battery 67. However, when the transistor $T_3$ is rendered conductive, then the circuit by way of the transistor $T_3$ renders the base of transistor $T_1$ positive relative to its collector to turn off the transistor $T_1$. The foregoing operation is quite analogous to the corresponding control circuits described above in connection with FIGS. 1 and 2.

In summary, it will be seen that the application of a positive signal at the input terminals 51 and 52 turns on the switching device 10 to render it effective as a constant current source. The application of a negative signal to the input terminals 51 and 52 operates the switching device 10 to its circuit opening state corresponding with an off position.

Assuming now a negative signal applied to the input terminals 51 and 52, it will be seen at once that the diodes 55 and 58 are rendered non-conductive. When the diode 58 is non-conductive, the battery or source 67 is effective to supply current through the circuit including the battery 62 and the resistors 63, 17 and 69. Accordingly, the base *b* of transistor $T_2$ is made negative with respect to the collector and that transistor is, accordingly, turned on, the values of the resistors 17, 63 and 69 being chosen for the proper switching potential rendered effective between the base and collector of transistor $T_2$.

As the diode 55 is rendered non-conductive, a current path is established for the battery 67 by way of the battery **62*a* and resistors 63*a*, 64 and 69*a***, thereby to produce a bias potential at the base of transistor $T_3$ more negative than the potential at the emitter *e*. The result is that the transistor $T_3$ is likewise turned on. Turning on the transistor $T_3$ is then effective to render the transistor $T_1$ non-conductive. This occurs by reason of the connection by way of the conductive transistor $T_3$ of the positive terminal of the battery 70 to the base of the transistor $T_1$.

There have now been described the operations by means of which the switching device 10 may be operated between its circuit-closing and its circuit-opening positions for flow of current of constant magnitude through precision resistor 12 and to terminate that flow.

With the above understanding of the operation of FIG. 3, the system of FIGS. 4B–4C will now be explained, it being understood that each of the switching assemblies **71*a*–71*d* of FIG. 4C respectively corresponds with the switching assembly of system 71 of FIG. 3. More particularly, the switching assembly or arrangement 71*a* of FIG. 4C has associated therewith a precision resistor 76 through which there flows the constant current, which, consistent with the earlier description, can be assumed to be 1 milliampere. This current $I_{c1}$ is to be taken as representative of the highest order or most significant position of a selected code, such for example, as the binary code. The current flowing through precision resistor 77 associated with the switching assembly or system 71*b* will have a magnitude corresponding with the next-most significant position or order of the code which is one-half that of the most significant order. Thus, a current $I_{c2}$ of ½ milliampere flows through resistor 77 by reason of the provision of the shunting resistor 78 which, as explained above, is selected in connection with the value of resistor 77 to provide the described operation, and particularly to maintain the parallel impedance of the resistors 77 and 78 equal to the resistance of resistor 76. Similarly, the currents $I_{c3}$ and $I_{c4}$ flowing through precision resistors 79 and 81 will have magnitudes corresponding with the remaining orders of the aforesaid code and, accordingly, will in turn each be reduced by one-half of the preceding current. This is accomplished by adjusting the relative values of the resistances of resistors or resistance branches 77, 78 and 79, 80, 81, 82. Again following the earlier example where the resistor 76 had a value of 15,000 ohms, the precision resistors 77, 79 and 81 will have values of 30,000 ohms, 60,000 ohms and 120,000 ohms, while resistors 78, 80 and 82** will respectively have values nominally 30,000 ohms, 20,000 ohms and about 17,143 ohms. The foregoing provides approximate equality in the parallel resistance of each of the aforesaid pairs of resistors.

In the above description, and that following, the explanation of the operation of the several constant current sources has been in terms of the division of currents between the precision resistors 77, 79 and 81 relative to their respective shunting resistors 78, 80 and 82 in conjunction with a low impedance comparator amplifier 23. It will be seen at once that if the comparator amplifier has a high input impedance, the operation of the circuit including the precision resistors can also be explained in terms of their cooperation as voltage dividing means. In this connection, it is to be noted that the shunting resistors 78, 80 and 82 are connected from each portion of the circuit correspondnding with the point 13 to ground, FIGS. 1, 2 and 4C. Accordingly, the shunting resistors have no effect upon the resistance of the composite circuit seen by the amplifier 23. The resistance which the amplifier sees in respect to the several circuits including precision resistors 76, 77, 79 and 81 remains constant regardless of whether one or the other of the several transistors of the switching arrangements **71*a*–71*d* is conductive. That this is so will be evident from FIG. 1 where it will be observed that the precision resistor 12 is always connected to ground by way of conductors 19*a* and 19. The connection is direct from transistor $T_2$ and effectively direct by way of the low impedance regulated source of supply 11**.

Similarly in FIG. 4C the resistors 76, 77, 79 and 81 are all connected in parallel and the resistance the amplifier 23 sees is the equivalent parallel resistance of these resistors.

Considering now the condition where the precision resistor 76 is connected through its transistor ($T_1$, FIG. 1) to the regulated voltage supply and where the precision resistor 77 is connected through its transistor ($T_2$, FIG. 1) to ground, and neglecting precision resistors 79 and 81, it will be seen that current will flow through a loop including the source of supply and precision resistors 76 and 77. Considering that loop, the current flowing through resistors 76 and 77 will be equal to the voltage at the source divided by the sum of their resistances. The voltage developed between ground and point 94 will then be the product of the current flowing through the precision resistor 77 and its resistance value. If resistor 76 has a value of R and that of resistor 77 is 2R, then the current flowing will be equal to $E/3R$, and the voltage will be equal to ⅔E, where E is the voltage of the source, and the comparison amplifier 23 is of the high impedance type so as to make negligible the current passing through the amplifier. If there now be considered the condition where the precision resistor 76 is connected to ground and the precision resistor 77 connected to the source of supply, the current flowing in the loop circuit will be the same and equal to $E/3R$. However, the voltage as seen by the high impedance amplifier 23 will now be equal to ⅓E. It is in this manner that the circuit configuration including the precision resistors 76, 77, 79 and 81 form voltage dividers which provide in effect a variable source of voltage dependent upon the operation of the switching arrangement **71*d***.

In some applications, the high impedance amplifier will be satisfactory. That it will be satisfactory will be apparent from the fact that at the condition of balance, there will be zero current flow (or approximately so) in the line 110 leading to the amplifier 23. For the high impedance amplifier at balance, the potential difference across the terminals will be zero, and the current division will be the same as previously described. Thus, at balance when the unknown current $I_x$ is equal to the current developed by the converting network, the impedance of the amplifier 23 has no effect upon the currents and voltages in the remainder of the circuit.

Now that it has been shown that an amplifier of either high or low impedance is satisfactory, the remaining description, for convenience, will be based upon use of a low impedance amplifier.

Whether or not any one or all of the currents $I_{c1}$–$I_{c4}$ flow will depend upon whether or not the switching arrangements 71*a*–71*d* have been operated to their on or circuit-closing positions.

From the foregoing, it will be seen at once that if all four currents flow, their sum will be representative of the analog value of the binary number 1 1 1 1 and that by selectively operating the switching arrangements 71*a*–71*d* the sum of the currents at the summing point 94 will be representative of the corresponding analog values of the selected binary number.

As will now be explained, the foregoing digital-to-analog converter is utilized as an analog-to-digital converter by including a comparison amplifier 23, together with suitable controls for the switching arrangements 71*a*–71*d*. The latter are controlled by flip-flop circuits 89–92, FIG. 4B, in a manner later to explained. For present purposes, it will be assumed that they operate as needed to support the following brief summary of the operation of the system of FIG. 4C. As explained in connection with FIGS. 1 and 2, the unknown $E_x$ may in FIG. 4C be connected to input terminals 85 and 86 for the production of a flow of current through a resistor 87 into a comparison circuit which forms a part of the input circuit including the conductor 110 of a comparison amplifier 23. With the switching arrangement 71*a* in its circuit-closing position, the constant current $I_{c1}$ will flow through the input circuit of the comparison amplifier 23. The direction of net current flow will depend upon whether $I_x$ is greater or less than the current $I_{c1}$. If $I_x$ is greater than $I_{c1}$, the amplifier 23 maintains a positive output indicative of a binary number having a one in the highest order representative of the magnitude of the current $I_x$ which, consistent with the initially assumed example, would have an analog value greater than 1 milliampere. Thus, if $I_x$ has a magnitude proportional to the magnitude of the condition under measurement, there will be developed a binary number proportional to the value of the magnitude of the condition under measurement, frequently called the measured variable.

Continuing the assumption that $I_x$ is greater than the current $I_{c1}$, current will flow in the direction indicated by the arrow and labeled $I_a$, and the comparison amplifier 23 has a positive output. The polarity of the output of amplifier 23 reverses when $I_x$ is less than $I_{c1}$. With the current $I_x$ greater than $I_{c1}$, the switching arrangement 71*a* is left in its circuit-closing position to continue to supply the current $I_{c1}$. The switching arrangement 71*b* is then actuated to its circuit-closing position for production of flow of current $I_{c2}$. If the sum of the currents $I_{c1}$ plus $I_{c2}$ be greater than the unknown current $I_x$, then the arrangement 71*b* is operated to its open-circuit position, and the circuit arrangement 71*c* is operated to its circuit-closing position for production of the flow of the smaller current $I_{c3}$.

The sum of $I_{c1}$ and $I_{c3}$ will be less than the sum of $I_{c1}$ plus $I_{c2}$, and the comparison amplifier 23 will again provide an output indicative of whether the new sum is less than or greater than the unknown current $I_x$. If for example, the sum $I_{c1}$ plus $I_{c3}$ is less than $I_x$, then in a cycle of operations the arrangement 71*a* remains on and so does the arrangement 71*c*. If the sum of $I_{c1}$ plus $I_{c3}$ plus $I_{c4}$ be greater than $I_x$, then the arrangement 71*d* will be returned to its circuit-opening position. Thus in the binary sytem, there will have been produced the binary number 1 0 1 0. Such a number will be exhibited by the signaling means shown in the form of signaling lamps 136–139, these to be taken as indicative of the output circuits normally associated with an analog-to-digital converter.

By selecting the needed values for the precision resistors, each stage can be utilized to represent given orders in any selected numbering system as in the decimal system.

With the above understanding of what the system of FIGS. 4B–4C accomplishes in broad outline of operation, there will now be described more in detail the manner in which the several devices of FIG. 4 cooperate the foregoing results.

In operation of the system of FIGS. 4B–4C the analog-to-digital conversion cycle is initiated by momentary closure of a starting switch 96 which completes an energizing circuit from a battery 97 to the coil of a relay 100 of the latched-in type for closure of its contacts 100*a*. The closure of contacts 100*a* completes a circuit from a pulse generator 101 for the operating coil of a scanning means shown as a stepping switch 102 having a scanning contact 102*a* operable through five different circuit-closing positions shown as 1–4 and C. The pulse generator 101 produces a succession of negative "step" pulses at the terminal designated "STEP" with short-time intervals between them of about 6 milliseconds.

The first step pulse from generator 101 operates the contact 102*a* from its "C" position to its first or No. 1 position to complete a connection from ground (the positive side of a source of supply, not shown) to an inverter 103. This inverter 103, as well as all other inverters shown by like symbols has a normally positive output with a normally negative or open-circuited input. For a positive or grounded input the inverter produces a negative output.

The negative output from inverter 103 is applied to one input circuit of an AND gate 106 and to one input circuit of AND gate 107. Thus the AND gates are enabled. These AND gates and the remaining AND gates of this application require a concurrent of negative inputs for production of a positive output. Thus, the presence of a positive pulse or signal on any input of an AND gate inhibits it, that is, prevents change of its output from negative to positive though it has been enabled by application to one input circuit of a negative pulse. In the normal condition, the AND gate has positive or ground potential inputs.

A preferred logic circuit suitable for the performance of the AND and inverter function have been illustrated in FIG. 5 later to be described in detail.

The AND gate 106 has its other input connected by conductor 108 to the terminal designated "ON" of the pulse generator 101. Negative "on" pulses about 6 milliseconds apart are applied to conductor 108 and follow by about 2 milliseconds the step pulses. Upon production of a negative "on" pulse, there appears a positive output from AND circuit 106 which is applied to the left-hand input terminal A of the flip-flop 89 which produces a positive output from terminal D to actuate the arrangement 71*a* to its on position for flow of the constant current $I_{c1}$ through precision resistor 76.

The flip-flops 89–92 may be of the type shown in FIG. 11–4A, page 11–292 of the book "Design of Transistorized Circuits for Digital Computers" by Abraham I. Pressman (Rider 1959). In the block diagrams of the flip-flops 89–92 the input terminals A and B correspond respectively with the "reset" and "set" input terminals of FIG. 11–4A, and in like manner the output terminals C and D correspond respectively with connections to the collectors of the left-hand and right-hand transistors of FIG. 11–4A.

If a positive pulse is applied to the input terminal A (corresponding with the left-hand "reset" terminal of Pressman) a negative potential is produced at the collector of his left-hand transistor and a positive potential at the collector of his right-hand transistor corresponding respectively with the output terminals C and D of the flip-flops 89–92. In similar manner, a positive pulse applied to the input terminal B produces a negative potential at the output terminal D and a positive potential at the output terminal C.

The above positive pulse applied by the AND circuit 106 to the input terminal A produces the foregoing positive output at the terminal D which is applied by conductor 109 to the switching circuit arrangement 71A to operate it to its circuit-closing position for supply of the aforesaid current $I_{c1}$.

The conductor 109 is connected to the input terminal of the circuit 71*a* at a point corresponding with the input terminal 51 of FIG. 3 and as described in connection with that circuit arrangement, produces the foregoing operation of the circuit arrangement 71*a*.

The manner in which the current $I_x$ and $I_{c1}$ are compared and the response of the comparison amplifier to any difference current has already been set forth. Thus when $I_x$ exceeds the current $I_{c1}$, the difference current $I_a$ flows toward the amplifier and produces at the output of the amplifier 23 a positive output which is then applied to an AND circuit 112. As explained above, the AND circuit 112 only functions to produce a positive output when both inputs are negative. However, when $I_x$ is less than $I_{c1}$ the direction of the difference current $I_a$ reverses and the output of the amplifier 23 then applies a negative potential to the AND circuit 112. When a negative potential is applied to the other input circuit by way of conductor 113, the AND circuit or gate 112 then has a positive output. The negative pulse applied by way of conductor 113 is derived from the pulse generator 101 from an output terminal labeled "OFF." From this terminal the generator delivers in succession negative "off" pulses spaced about six milliseconds apart and following the "on" pulses by about two milliseconds. Thus with the appearance of an "off" pulse there is applied to an inverter circuit 114 a positive input for production of a negative output which is applied by conductor 115 to AND circuit 107 already described as having at its other input circuit a negative potential. Thus the AND circuit 107 produces a positive output which is applied to the input terminal B to cause the flip-flop 89 to change states. The resultant negative output produced at terminal D operates the switching arrangement 71*a* to open-circuit position to interrupt the flow of the current $I_{c1}$.

To simplify the further description, it will be assumed that the unknown current $I_x$ has a value slightly greater than the sum of the constant or standard currents $I_{c2}$ and $I_{c4}$. Thus, for the reasons already described, the assumed unknown current $I_x$ will have a value less than $I_{c1}$, greater than $I_{c2}$ and less than the sum of $I_{c2}$ and $I_{c3}$. In accordance with these values, for a cycle of operations, the arrangements 71*a* and 71*c* will be operated to their circuit-opening or off positions while the arrangements 71*b* and 71*d* will be operated to their circuit closing or on positions. The first or No. 1 position for the cycle of operations has been described above where arrangement 71*a* was operated to its circuit-opening position so that it is necessary now only to describe the remaining second, third and fourth positions for the contact 102*a*.

After a time interval of about 6 milliseconds after the first step pulse, or about 2 milliseconds following the first off pulse, a second step pulse is produced by the generator 101 to operate the contact 102*a* from its first to its second or No. 2 position to complete a connection from ground to an inverter 111. For a grounded input, the inverter 111 produces a negative output which is applied to one input circuit of an AND circuit 117 and to one input circuit of an AND gate 118. These AND gates are enabled, and upon appearance of a second negative on pulse, the AND gate 117 produces a positive output pulse which is applied to the left-hand input terminal A of the flip-flop 90. The positive pulse applied to the input terminal A of the flip-flop 90 produces a positive output from its terminal D to turn the switching arrangement 71*b* to its circuit-closing position for flow of the constant current $I_{c2}$ through the precision resistor 77.

It will be remembered that the assumed value of $I_x$ exceeds the constant current $I_{c2}$ and thus the difference current $I_a$ flows in a direction toward the amplifier 23 and produces a positive output from the amplifier 23 which is applied to the AND circuit 112. The positive output from the amplifier 23 inhibits the AND circuit 112 and the appearance of a second off pulse by way of conductor 113 has on effect upon the AND circuit 112 so that its output remains negative. The foregoing negative output from AND circuit 112 is applied to the inverter circuit 114 for production of a positive output which is applied by conductor 115 to an input circuit of AND circuit 118 already described as having applied thereto a negative potential to its other input circuit. Thus, the AND circuit 118 is inhibited by the positive input and flip-flop 90 is maintained without change of states. Since the flip-flop 90 does not change state, it still provides a positive potential at its terminal D for maintaining the switching arrangement 71*b* in its circuit-closing position for uninterrupted flow of the constant current $I_{c2}$.

It will now be observed that the constant current $I_{c1}$ was terminated while the constant current $I_{c2}$ continues to flow in accordance with the assumed condition. The sum of the currents $I_{c2}$ and $I_{c3}$ is greater in value than the assumed unknown current $I_x$. Thus, for the third step pulse and the third circuit-closing position of the switch 102*a*, the switching arrangement 71*c* will first be operated to its circuit-closing position for flow of $I_{c3}$ and then to its circuit-opening position for termination of $I_{c3}$. The foregoing operation of the arrangement 71*c* is similar to that described in connection with arrangement 71*a* and the current $I_{c1}$. For the third step pulse, the AND circuits 121 and 122 are enabled. The third on pulse produces a positive pulse from the enabled AND circuit 121 which switches the state of the flip-flop 91 to produce a positive potential from its output terminal D. That positive potential is applied by way of conductor 124 to the switching arrangement 71*c* turning it to its circuit-closing position for flow of the constant current $I_{c3}$. Since the sum of the currents $I_{c2}$ and $I_{c3}$ is greater in magnitude than the magnitude of the unknown current $I_x$, the amplifier 23 produces a negative output which is applied to an input circuit of the AND gate 122 which has previously been enabled. The AND gate 122 produces a positive output which switches the flip-flop 91 to its initial state to operate the arrangement 71*c* to its circuit-opening position for termination of flow of the constant current $I_{c3}$.

The stepping switch 102*a* is operated to its fourth circuit-closing position upon appearance of a fourth step pulse and thereby produces operation of the switching arrangement 71*d* to its circuit-closing position for flow of the constant current $I_{c4}$. With the assumed unknown current $I_X$ slightly greater than the sum of currents $I_{c2}$ and $I_{c4}$, the difference current $I_a$ will flow in the direction indicated by the arrow. The foregoing direction of the difference current $I_a$ is similar to the situation occurring when switching arrangement 71*b* was turned to its circuit closing position for flow of $I_{c2}$ current so that it is unnecessary here to describe in detail the operation of the AND gates 125 and 126 and flip-flop 92 for maintaining the switching arrangement 71*d* in its circuit-closing position for uninterrupted flow of the constant current $I_{c4}$.

From the foregong it will be seen that for a cycle of operations, the arrangements 71*b* and 71*d* remain in their circuit-closing positions while the arrangements 71*a* and 71*c* are returned to their circuit-opening positions. Thus, in the binary system there has been produced the binary number 0 1 0 1 of magnitude proportional to the analog value of the measured variable in terms of the current $I_X$.

The four circuit-closing positions having been traversed by the contact 102a, it will now be shown that the operation of the contact 102a to its C or homing position is effective to produce a positive signal which is applied to the switching arrangements 71a–71d to reset them to their initial circuit-opening or off positions preparatory to a further cycle of operations. Accordingly, a fifth step pulse from the generator 101 is effective to operate the contact 102a from its fourth position to its C or homing position. There is thus completed a connection from ground to the input of inverter circuit 128. As will later be described, when the input to an inverter circuit is grounded, the output thereof is connected to a source of negative potential. A circuit may be traced from the positive side of the foregoing negative source by way of ground, the input terminals of the amplifier 132, diode 131, capacitor 129, and then back to the negative side of the foregoing source. Thus, current flows into the lower input terminal of the amplifier 132 and out of the upper input terminal, so that the upper terminal has applied thereto a potential negative with respect to ground. Further, since the upper input terminal of the amplifier 132 is negative with respect to ground, the upper output terminal of the amplifier 132 is similarly negative with respect to ground. That negative potential is applied by way of conductor 133 to energise the tripping coil 100b thus opening the contacts 100a of relay 100. Since the contacts 100a are now open, the coil of relay 102 may no longer be energized and thus the contact 102a is maintained in its C position.

In addition to energizing the coil 100b, the negative output of the amplifier 132 is applied by way of conductor 135 to an inverter 140, and from its output a positive signal is applied to the diodes 141–144. The foregoing positive signal is transmitted through each of the diodes 141–144 for application to each of the input terminals B of the flip-flops 89–92 of a positive reset signal which switches each of the flip-flops to their initial or reset states. Each of the flip-flops 89–92 will thereupon produce a negative potential at its output terminal D which is in a direction for turning each of the switching arrangements 71a–71d to their circuit-opening or off positions so that the arrangements 71b and 71d previously in their on positions are switched to their circuit-opening positions for termination of the constant currents $I_{c2}$ and $I_{c4}$. Thus, the analog-to-digital converter of FIG. 4 has been returned to its initial state and the operations above described will now be repeated to successively approximate a new value of unknown current $I_x$ from the same or from a different source to produce its equivalent in the binary system.

It may easily be seen by those skilled in the art that the switching arrangements 71a–71d may not only be used in an analog-to-digital converter but may also be utilized in a digital-to-analog converter. In the above description of the analog-to-digital converter, as illustrated in FIG. 4, the switching arrangements 71a–71d were successively turned to their circuit-closing or on positions and then selected ones of the arrangements were maintained in their circuit-closing position while the remaining ones were switched to their circuit-opening positions to produce a current approximately equal in value to an unknown current. From the foregoing it becomes clear that in a digital-to-analog converter the switching arrangements 71a–71d will be switched to either their circuit-closing or circuit-opening positions in accordance with a binary number, which binary number is to be converted to its analog equivalent. Stated differently, the positions of the arrangements in their circuit-closing positions will correspond with the positions of the "1's" in the foregoing selected binary number and the positions of the arrangements in their circuit-opening positions will correspond with the positions of the 0's in the binary number. The constant currents produced by the switching arrangements, which are in their circuit-closing or on position, are summed to produce a resultant current which is proportional to the analog value of that binary number. In summary, when the switching arrangements 71a–71d produce currents in accordance with a binary number, there is produced a resultant current proportional to the analog value of that binary number. That resultant current may be read by an ammeter connected at a point in the conductor 110 and in series circuit relation therewith.

In the above description the logic circuits or gates, referred to as inverters and AND circuits, may be of any one of several designs known to those skilled in the art provided only that they perform the above described functions. In a preferred embodiment of the invention, the aforesaid logic circuits are each of the type schematically illustrated in FIG. 5. In FIG. 5 a first of the input circuits extends between the terminal labeled A and the terminal labeled G. The second of the input circuits extends between the terminal label B and the terminal G. In addition, the output circuit in FIG. 5 extends between the terminals labeled C and G.

If there is provided only a single input circuit, such as the circuit between the terminals A and G, the circuit of FIG. 5 functions as an inverter, which function will now be described. It will be assumed that there is absent any signal to the input terminals A and G, that is, that the input switches 150–152 are each in their illustrated open position. Nevertheless current flows from the battery 154 by way of ground, the bias supply 155 shown as a 6-volt battery, and thence by way of resistors 157, 158 and 159 to the other side of source 154. The junction point 160 is connected to the base b of the transistor 162 of the PNP type having its emitter e connected to ground potential G by way of conductor 163a and 163 while collector C is connected by way of resistor 164 to the negative side of the battery 154. Accordingly, the aforesaid flow of current through resistors 157–159 produces a bias on the base b negative with respect to the emitter e. Thus, the transistor 162 is turned on or made conductive. As a result of the conduction of the transistor 162, the output terminal C is effectively connected to potential G, or stated differently, the output terminal C is directly connected to the positive terminal of the battery 154. From the foregoing it may be seen that in the absence of an input signal to the input terminals A and G, with the input switches 150–152 in their open position, the output of the system of FIG. 5 is normally at ground.

It will now be assumed that the switch 150 is closed to apply to the input terminal A a negative potential with respect to the ground terminal G. This negative potential is effective to non-conductively bias the diode 166 so that there is no flow of current through that diode. Thus, the application to the terminal A of a negative potential has no effect upon the circuit above described so that the output terminal C is again effectively connected to ground potential.

Assuming now that switch 152 is closed to connect ground potential G or conductor 163 to input terminal A, it will be seen that a circuit is formed for current from the positive side of battery 154 to the input terminal A to cause the conduction of diode 166. When the diode 166 is conductive, it forms a circuit for the current from the battery 154, which current then flows by way of ground to the switch 152, diode 166, and thence by way of the resistor 159 to the other side of the battery 154. The result of this circuit is that the positive bias potential of the bias battery 155 is then made effective by way of resistor 157 to bias the base b of transistor 162 in a positive direction relative to its emitter, which it is noted is connected to ground. Thus, the transistor $T_2$ is turned off or rendered non-conductive. With the transistor 162 turned off, the output terminal C is at a potential negative with respect to ground G as a result of its connection by way of resistor 164 to the negative side of the battery 154.

The foregoing operations meet the requirements of an inverter circuit where either a negative input or the absence of an input signal will be considered a normal input with a resultant positive output. In addition, an input short-circuited to ground will be considered the presence of an input signal with a resultant negative output.

It will now be assumed that the input terminals A and B are both normally at ground potential. Thus, the circuit of FIG. 5 will normally have a negative output which output will be maintained until there has been applied negative potentials or open circuits to both of the input terminals A and B. The need of concurrence of negative inputs to both the inputs A and B for a positive output satisfies the requirement of an AND gate. Stated in a different way, when and only when both of the inputs are negative, the output is positive to satisfy the definition of an AND gate.

In a typical embodiment of the circuit of FIG. 6, the transistor 162 is of the PNP type, such for example, as a 2N504, while the diodes, which are unilaterally conductive, are of the type known as Transitron Part No. S-6690. It is to be understood that a transistor of the NPN type may be utilized with suitable reversal of the polarity of the batteries 154 and 155 and the corresponding reversal of connections of the diodes in the input circuit. The polarity requirements and the resultant polarity of the output signal will all be reversed from those described for the PNP type of transistor 162. The resistors 157, 158, 159 and the voltages of the sources of supply 154 and 155 will be selected to suit the requirements of the particular transistor used. For the examples used in the above description, these resistors may have values of 18,000, 3,300, 12,000 and 12,000 ohms respectively.

Referring now to FIG. 6, it will be noted that the device 10 is similar to that shown in FIG. 1 except that the PNP transistors $T_1$ and $T_2$ have been replaced with NPN transistors. Corresponding changes have been made in the polarity of the regulated-voltage supply and in the batteries 14′, 14a′, 16′ and 16a′. In addition, the directions of the constant current $I_c$ and the unknown current $I_x$, as shown by the respective arrows, are opposite in direction to that shown in FIG. 1.

What is claimed is:

1. The combination with a transistor having at least an emitter, a base and a collector, of a voltage-regulated source,
- a series circuit including said source of supply, said emitter and said collector,
- a precision resistor connected in said series circuit between said collector and said regulated source,
- means including a second source connected to said base and to said precision resistor on the side thereon remote from said collector having a polarity and magnitude which fully turn on said transistor for establishing between said emitter and said collector a potential difference of negligible magnitude,
- and means including said second source for establishing at a junction between said collector and said precision resistor a potential which is slightly below the potential of said regulated supply, said regulated source supplying a current of low magnitude compared with that of said second source through a path including said emitter and collector of said transistor, said path being characterized by its said negligible potential difference between said emitter and said collector for maintaining said junction point at said potential of said regulated source of supply.

2. The combination with a transistor having at least an emitter, a base and a collector, of a voltage-regulated source of supply, a series circuit including said source of supply, said emitter and said collector, a precision resistor connected in said series circuit between said collector and said regulated source of supply, means including a second unregulated source of supply connected to said base and to said precision resistor on the side thereof remote from said collector, said second source of supply having a polarity and magnitude for turning on said transistor to render it conductive and for producing a current flow through the collector and base thereof of magnitude which brings it into its saturation range for producing between its emitter and collector a potential difference of relatively low order, said voltage-regulated source of supply having a polarity between said emitter and collector the same as said second source of supply between base and collector whereby said regulated source of supply establishes a potential difference across said precision resistor of magnitude equal to that of the voltage of said regulated source of supply minus said potential difference of low order of magnitude developed between the emitter and collector of said transistor, the current flow from said regulated source of supply being of a low order of magnitude compared with the magnitude of the current flow through said precision resistor from said second source of supply, a second transistor having at least an emitter, a base and a collector, a circuit interconnecting the collector of said first-named transistor and the emitter of said second transistor, a circuit connecting said collector of said second transistor to said connection of said precision resistor to said regulated source, and biasing means for maintaining said second transistor non-conductive while said first transistor is conductive.

3. A system for producing a current of constant magnitude through a precision resistor characterized by the fact that a major component of the current is supplied from an unregulated source of supply and a minor component from a voltage-regulated source of supply, the voltage of the unregulated source of supply being greater than that of the regulated source of supply, comprising a transistor having at least an emitter, a base and a collector, means connecting said voltage-regulated supply in series with said transistor and said precision resistor, said precision resistor being connected on the collector side of said transistor relative to said voltage-regulated source of supply, means connecting said unregulated source of supply to said base and to said collector, and in series with said precision resistor, the current of said unregulated source of supply being effective fully to turn on said transistor with development of a negligible potential difference between its emitter and collector, whereby there is produced from said sources of supply a constant current through said precision resistor, an output circuit connected to said precision resistor on the side thereof remote from said collector of said transistor, a second transistor having at least an emitter, a base and a collector, means connecting the emitter of said second transistor to said collector of said first transistor, and means for rendering said first-named transistor non-conductive and for rendering said second transistor conductive for establishing a current path for leakage currents from said first-named transistor through a circuit including said second transistor.

4. A transistor switching device comprising first and second transistors each having a collector, a base and an emitter, a circuit interconnecting the collector of said first transistor and said emitter of said second transistor, a voltage-regulated source of supply having one side connected to said emitter of said first transistor and the other side to said collector of said second transistor, a precision resistor connected between said circuit and said collector of said second transistor, and means for selectively rendering said first transistor conductive and said second transistor non-conductive, and vice versa, said means including a source of current which is effective when said first transistor is rendered conductive for producing a major component of the current flowing through said precision resistor corresponding with the base current of said first transistor, the remaining minor component of currrent flowing through said precision resistor comprising the emitter current of said first transistor, said second transistor when conductive providing a low impedance path for leakage currents from said first transistor during the time it is non-conductive.

5. The transistor switching device of claim 6 in which said means for selectively rendering said transistors conductive and non-conductive comprises a control circuit connected to the base of one of said transistors and inverter means connected between said base of the other of said transistors and said control circuit so that application of an input signal of a first polarity renders one of said transistors conductive and said other transistor non-conductive, and an input signal of a second polarity renders said last-named transistor conductive and said remaining transistors non-conductive.

6. A system for producing a current of constant magnitude through a precision resistor characterized by the fact that a major component of the current is supplied from an unregulated source of supply and a minor component from a voltage-regulated source of supply, comprising a first and a second transistor, each having at least an emitter, a base and a collector, means connecting said voltage-regulated supply between said emitter of said first transistor and a first side of said precision resistor, a circuit interconnecting a second side of said precision resistor to (1) said collector of said first transistor and (2) said emitter of said second transistor, and biasing means for turning off said second transistor when said first transistor is turned on, said unregulated source of supply being connected between said base of said first transistor and said first side of said precision resistor for supplying a current effective fully to turn on said first transistor to produce a potential difference of relatively low order between its emitter and collector, whereby said voltage-regulated source of supply establishes a potential difference across said precision resistor of magnitude equal to that of the voltage of said regulated source minus said potential difference of relatively low order.

7. The system of claim 8 in which there is included biasing means for turning off said first transistor thereby to terminate said flow of current of constant magnitude, and means including said first-named biasing means for turning on said second transistor to establish a current path for leakage current from said first transistor through the low impedance circuit of said second transistor.

8. A system for producing a current of constant magnitude through a precision resistor characterized by the fact that a high order of magnitude of the current is supplied by an unregulated source of current and a low order of magnitude of current is supplied by a voltage-regulated source of supply, comprising at least a first, a second and a third transistor each having an emitter, a base and a collector, means connecting a first terminal of said voltage-regulated supply to said emitter of said first transistor and a second terminal to (1) a first side of said precision resistor and (2) said collector of said second transistor, a circuit interconnecting a second side of said precision resistor to (1) said collector of said first transistor and (2) said emitter of said second transistor, a first and second resistance means, one end portion of each of said first and said second resistance means being connected to a source of potential, the other end portion of each of said first and said second resistance means being connected to a source of potential opposite to said last-named source, means connecting a first intermediate portion of said second resistance means to said base of said second transistor, a first intermediate portion of said first resistance means being connected to said base of said third transistor, means connecting said unregulated source of current to said base of said first transistor for supplying current effective fully to turn on said first transistor, thereby to establish a potential difference of relatively low order between its emitter and collector, said base of said first transistor being connected to said collector of said third transistor which when conductive provides a low impedance circuit to a potential of polarity for rendering said first transistor non-conductive, and means for applying input signals to a second intermediate portion of each of said first and said second resistance means of a first polarity for rendering conductive said second and said third transistors and of a second polarity for rendering non-conductive said second and said third transistors.

9. An analog-to-digital converter system for producing electrical signals representative of the digits in the several orders of a number of a selected numbering system of magnitude proportional to an unknown analog value which value is represented by an unknown current, comprising a plurality of switching means corresponding in number with the number of said orders and respectively representative of said orders, each said switching means including first and second transistors each having at least a collector, a base and an emitter, precision resistance means for each said switching means, each said switching means having a circuit interconnecting (1) a first side of said resistance means; (2) said collector of said first transistor; and (3) said emitter of said second transistor, comparison means connected to a second side of each of said resistance means, a voltage-regulated source of supply having one side connected to said emitter of each of said first transistors and the other side to said comparison means, energizing means including unregulated sources of current for each said switching means having connections respectively to said base of said first transistor and to said base of said second transistor operable for selectively rendering said first transistor conductive and said second transistor non-conductive, and vice versa, said source of current connected to said base of said first transistor being effective to establish operation in its saturation range with resultant production between its emitter and collector of a potential difference of relatively low order, each of said resistance means having a resistance value for flow therethrough of a constant current when its respective first transistor is conductive of magnitude corresponding with the order represented by its respective switching means, each of said constant currents having a major component thereof supplied from said unregulated source of current connected to said base of said first transistor and a minor component from said voltage-regulated source of supply, said voltage-regulated source of supply establishing a potential difference across each of said first resistors of magnitude equal to that of the voltage of said voltage-regulated supply minus said potential difference of low order of magnitude, and scanning means for operating in succession each of said energizing means for comparing magnitudes of said constant currents with said unknown current.

10. The converter system of claim 9 in which each said precision resistance means includes shunting means for producing substantially equal magnitudes of currents in the collector circuit of each of said conductive first transistors.

11. The converter system of claim 9 in which said scanning means includes bistable means for each said switching means each having two stable states and a stepping switch having a separate one of its contacts connected to each of said bistable means for successively changing the stable states of each of said bistable means.

12. The converter system of claim 11 in which each said energizing means includes first and second resistance means, one end portion of each of said first and second resistance means being connected to a source of potential, the other end portion of each of said first and second resistance means being connected to a source of potential opposite to said last-named source, means connecting in each said switching means a first intermediate portion of said second resistance means to said base of said second transistor, each said switching means having means connecting an inverter means between a first intermediate portion of said first resistance means and said base of said first transistor, and additional means for each said switching means connecting a second intermediate portion of said first and second resistance means to a respective bistable means.

13. The converter system of claim 11 in which there is included a comparison amplifier having an input and an output, summing means connected to said input of said comparison amplifier for comparing the magnitude of said constant currents with said unknown current, and means including said scanning means connected to said output of said comparison amplifier operable for rendering non-conductive said first transistor of each of said switching means when the sum of said constant currents has a magnitude greater than said unknown current and to maintain conductive said first transistor of each of said switching means when said sum has a magnitude less than said unknown current.

14. A system for converting electrical signals representative of the digits in the orders of a number in a selected numbering system to a current of magnitude proportional to an analog value of that number, comprising a plurality of switching means corresponding in number with the number of said orders and repectively representative of said orders, each of said switching means including a first and a second transistor each having at least a collector, a base and an emitter, each said switching means having a circuit interconnecting said collector of said first transistor and said emitter of said second transistor, a precision resistor for each said switching means connected between said circuit and said collector of said second transistor, a voltage-regulated source having one side connected to said emitter of said first transistors and the other side to said collector of each of said second transistors, means including current sources for each said switching means having connections to said base of said first transistor and to said base of said second transistor operable for selectively rendering said first transistor conductive and said second transistor non-conductive, and vice versa, said current source connected to said base of said first transistor being effective to bring said first transistor into its saturation range when said first transistor is rendered conductive for producing between the emitter and collector thereof a potential difference of relatively low order, said voltage-regulated source of supply establishing a potential difference across each of said precision resistors of magnitude equal to that of said voltage-regulated supply minus said potential difference of low order of magnitude, each of said precision resistors having a resistance value for flow therethrough of a constant current of magnitude corresponding with the order represented by its respective switching means, and means for rendering conductive predetermined ones of said first transistors to produce constant currents the sum of which is proportional to said analog value of said number.

References Cited by the Examiner

UNITED STATES PATENTS

| | | | |
|---|---|---|---|
| 2,733,432 | 1/1956 | Breckman | 340—347 |
| 2,738,504 | 3/1956 | Gray | 340—347 |
| 2,956,179 | 10/1960 | Yragui | 307—88.5 |
| 2,971,100 | 2/1961 | Hurst et al. | 307—88.5 |
| 3,009,070 | 11/1961 | Barnes | 307—88.5 |
| 3,051,851 | 8/1962 | Leonard | 307—88.5-4 |

FOREIGN PATENTS

| | | |
|---|---|---|
| 821,765 | 10/1959 | Great Britain. |

ARTHUR GAUSS, *Primary Examiner.*

IRVING L. SRAGOW, *Examiner.*